(12) United States Patent
Cook

(10) Patent No.: US 10,156,712 B2
(45) Date of Patent: Dec. 18, 2018

(54) DETACHABLE DEEP-VIEWING COAXIAL ILLUMINATOR FOR FLASHLIGHTS WITH COMPANION TELESCOPIC MAGNIFIER

(71) Applicant: Walter J. Cook, Alta Loma, CA (US)

(72) Inventor: Walter J. Cook, Alta Loma, CA (US)

(73) Assignee: Walter J. Cook, Alta Loma, CA (US)

( * ) Notice: Subject to any disclaimer, the term of this patent is extended or adjusted under 35 U.S.C. 154(b) by 85 days.

(21) Appl. No.: 15/330,495

(22) Filed: Sep. 27, 2016

(65) Prior Publication Data

US 2018/0088315 A1 Mar. 29, 2018

(51) Int. Cl.
| | |
|---|---|
| *G02B 25/02* | (2006.01) |
| *G02B 25/00* | (2006.01) |
| *G02B 7/04* | (2006.01) |
| *F21V 7/00* | (2006.01) |
| *G02B 7/02* | (2006.01) |
| *F21V 19/02* | (2006.01) |
| *F21V 21/14* | (2006.01) |
| *F21V 21/22* | (2006.01) |
| *F21L 4/04* | (2006.01) |
| *G02B 23/24* | (2006.01) |
| *F21L 4/00* | (2006.01) |

(52) U.S. Cl.
CPC .............. *G02B 25/02* (2013.01); *F21L 4/04* (2013.01); *F21V 7/0008* (2013.01); *F21V 7/0075* (2013.01); *F21V 19/02* (2013.01); *F21V 21/145* (2013.01); *F21V 21/22* (2013.01); *G02B 7/02* (2013.01); *G02B 7/04* (2013.01); *G02B 23/24* (2013.01); *G02B 23/2461* (2013.01); *G02B 25/005* (2013.01); *G02B 25/008* (2013.01); *F21L 4/00* (2013.01); *G02B 25/002* (2013.01)

(58) Field of Classification Search
CPC .......... G02B 7/003; G02B 7/004; G02B 7/02; G02B 7/023; G02B 23/02; G02B 23/10; G02B 23/105; G02B 23/26; G02B 25/001; G02B 25/002; G02B 25/005; G02B 25/02; G02B 27/02; F21V 7/0008; F21V 7/0075; F21V 7/0091; F21V 14/02; F21V 19/02; F21V 19/0075; F21V 21/084; F21V 21/14; F21V 21/145; F21V 21/22; F21V 21/30; F21V 21/32; F21L 2/00; F21L 4/00; F21L 4/005; F21L 4/027; F21L 4/04; F21L 4/08
USPC ....... 359/799, 802, 803, 818, 823, 827, 829, 359/833, 837; 362/16, 18, 120, 196–199, 362/208, 285, 389, 419, 421; 396/17, 396/179, 180
See application file for complete search history.

(56) References Cited

U.S. PATENT DOCUMENTS

| | | | | |
|---|---|---|---|---|
| 2,178,371 | A * | 10/1939 | Eichenberger | G02B 25/02 359/803 |
| 3,184,589 | A * | 5/1965 | Gibbens | F21V 19/02 362/197 |
| 3,510,643 | A * | 5/1970 | File | A47G 21/02 30/123 |

(Continued)

*Primary Examiner* — Loha Ben

(57) ABSTRACT

A deep-viewing coaxial illuminator accessory that may be easily reversibly attached to commercial high-brightness, focusable-beam flashlights to provide shadow-free viewing of subject matter up to 20 ft or more away is disclosed. A miniature companion telescopic magnifier for optional use with the coaxial illuminator that provides erect-image magnified viewing and may be easily reversibly attached to the illuminator is described.

2 Claims, 4 Drawing Sheets

(56) References Cited

U.S. PATENT DOCUMENTS 5,567,115 A * 10/1996 Carbone ................ F16M 11/40
362/198
5,848,835 A * 12/1998 Cook .................. F21V 33/0084
362/138

* cited by examiner

DETACHABLE DEEP-VIEWING COAXIAL ILLUMINATOR FOR FLASHLIGHTS WITH COMPANION TELESCOPIC MAGNIFIER

CROSS-REFERENCES TO RELATED APPLICATIONS

| Pat. No. | Issue Date | Patentee | CPC Classification | US Classification |
| --- | --- | --- | --- | --- |
| U.S. 5,848,835 A | December 1998 | Cook, Walter J.C. | F21V33/0084 | 362/138 |
| U.S. 5,567,15 A | October 1996 | Richard J. Carbone | F16M11/40 | 362/198 |
| U.S. 3,184,589 A | May 1965 | Gibbons, Alfred L | F21V19/02 | 362/197 |
| U.S. 3,510,643 A | May 1970 | File, Robert H | A47G21/02 | 30/123 |
| U.S. 5,220,453 | | | | |
| U.S. 6,985,287 | | | | |

STATEMENT REGARDING FEDERALLY SPONSORED RESEARCH OR DEVELOPMENT

Not applicable

THE NAMES OF PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

Not applicable

BACKGROUND OF THE INVENTION

(1) Field of the Invention

This invention describes a detachable, deep-viewing coaxial illuminator accessory for commercial focusable-beam flashlights that provides shadow-free viewing of subject matter up to 20 feet or more away from the illuminator. The present invention may be used to clearly view inside automobile engines and other equipment through small holes or vent openings, behind walls through small openings, through plumbing pipes and narrow tubing.

A miniature companion telescopic magnifier that reversibly attaches to the eyepiece of this deep-viewing coaxial illuminator and provides magnified non-inverted viewing of objects and sharply focuses over the distance range of the illuminator is also described. The least expensive embodiments of the present invention is suited for use by the general public, auto mechanics, construction workers, and those involved in technical and scientific work.

(2) Description of Related Art

Devices that permit clear viewing into recesses are currently expensive fiber optic electronic imagers that sell for hundreds of dollars each, and are typically limited by the short fiber optics cable to viewing objects up to a few feet away. Their high cost prevents use by the general public.

This invention is made practical by the development of modern high-brightness, focusable-beam flashlights. The present deep-viewing coaxial illuminator has a different optical design from that described in U.S. Pat. No. 5,848,835 which is limited to viewing objects only 1 foot away. This new optical design uses a reflective mirror with a center hole for viewing through, instead of the "beam splitter" described in the previous patent. The mirror provides enhanced flashlight illumination at large distances from the illuminator, and eliminates the slight glare from the flashlight from the beam splitter that degrades viewing contrast of far-away objects. Other commercial designs described in U.S. Pat. Nos. 5,220,453 and 6,985,287 are not suitable for use as a detachable accessory for a flashlight, those described in U.S. Pat. Nos. 3,184,589 and 3,510,643 do not provide co-axial illumination needed to view into deep recesses.

The miniature non-inverting telescope quickly and easily attaches to the deep-viewing coaxial illuminator eyepiece to provide erect-image viewing of objects up to at least 20 ft away. Its use with the coaxial illuminator is optional. Available non-inverting (terrestrial) telescopes with all-glass optics are too expensive, bulky, and heavy to use as an attachment to the light-weight coaxial illuminator flashlight accessory described, and are optically designed to focus on distant objects (10 ft to infinity).

BRIEF SUMMARY OF THE INVENTION

The present invention has the following advantages over prior art—

(a) It provides true coaxial-illumination and shadow-free viewing of objects up to 20 feet away using illumination from commercial high-brightness, focusable-beam flashlights.

(b) It may be manufactured at a fraction of the cost of currently available electronic imagers, so the general public can benefit.

(c) Because it is a conveniently detachable flashlight accessory, the owner's flashlight may be used as an ordinary flashlight with this accessory removed.

(d) An optional miniature companion telescopic magnifier that is described may be easily attached to the coaxial illuminator eyepiece to provide image-erect, magnified viewing thru the coaxial illuminator.

Figure 1:
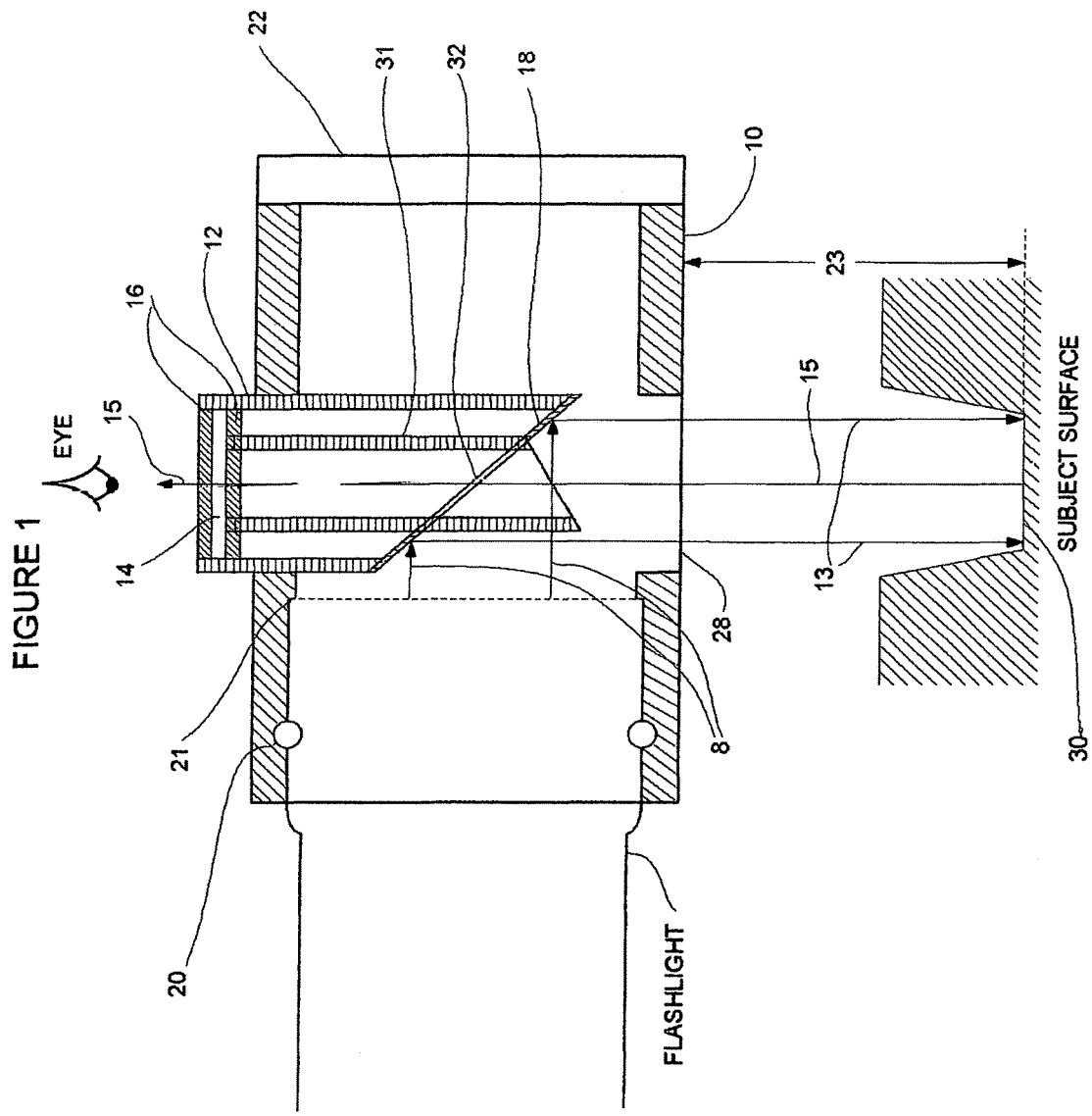
FIG. 1 and FIG. 2 show a cross-sectional view and a 3-D view, respectively, of the preferred embodiment of the present deep-viewing coaxial illuminator.
Figure 2:
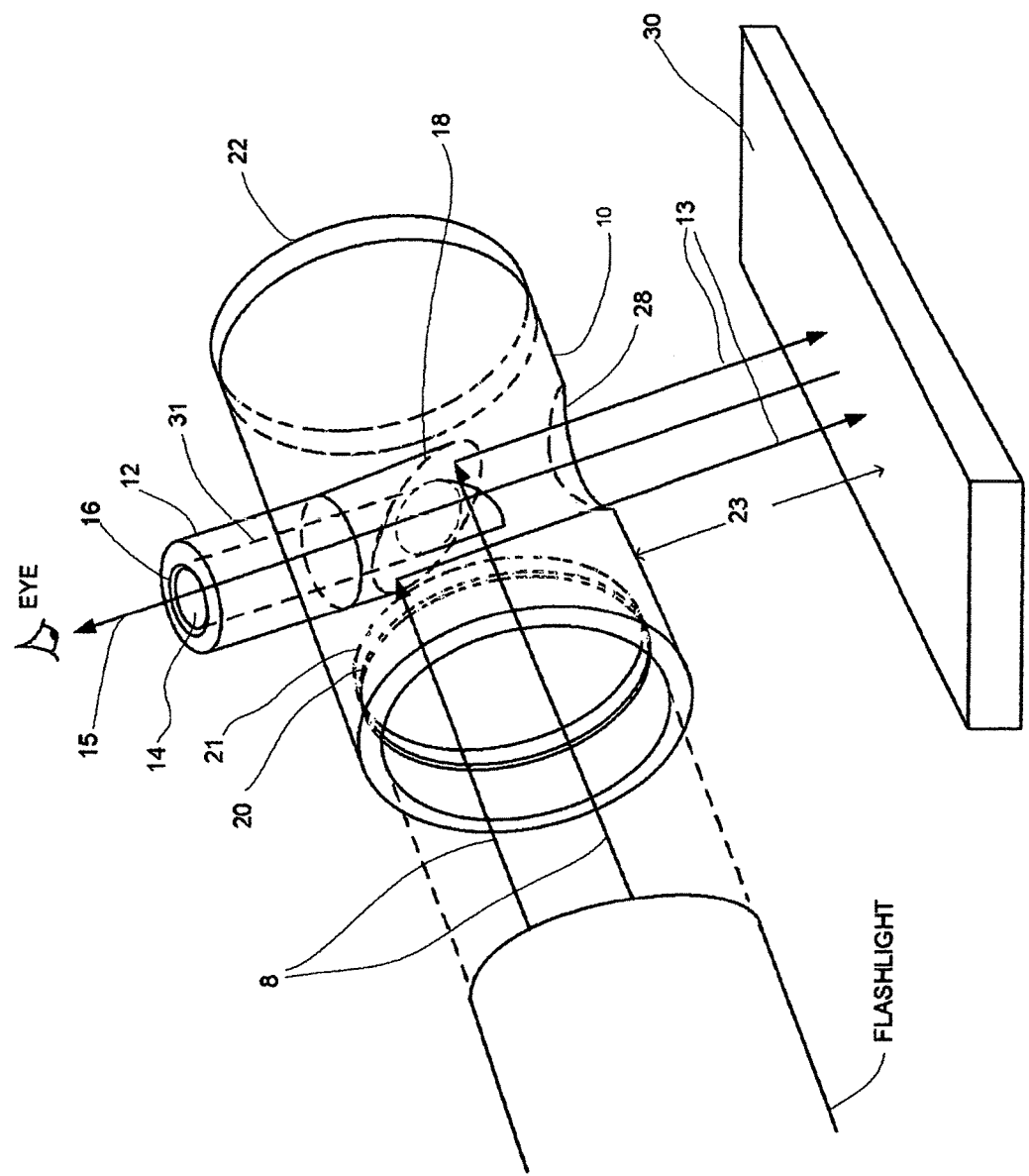

Reference Numbers in FIGS. 1 and 2 and dimensions are for preferred embodiment.

Figure 3:
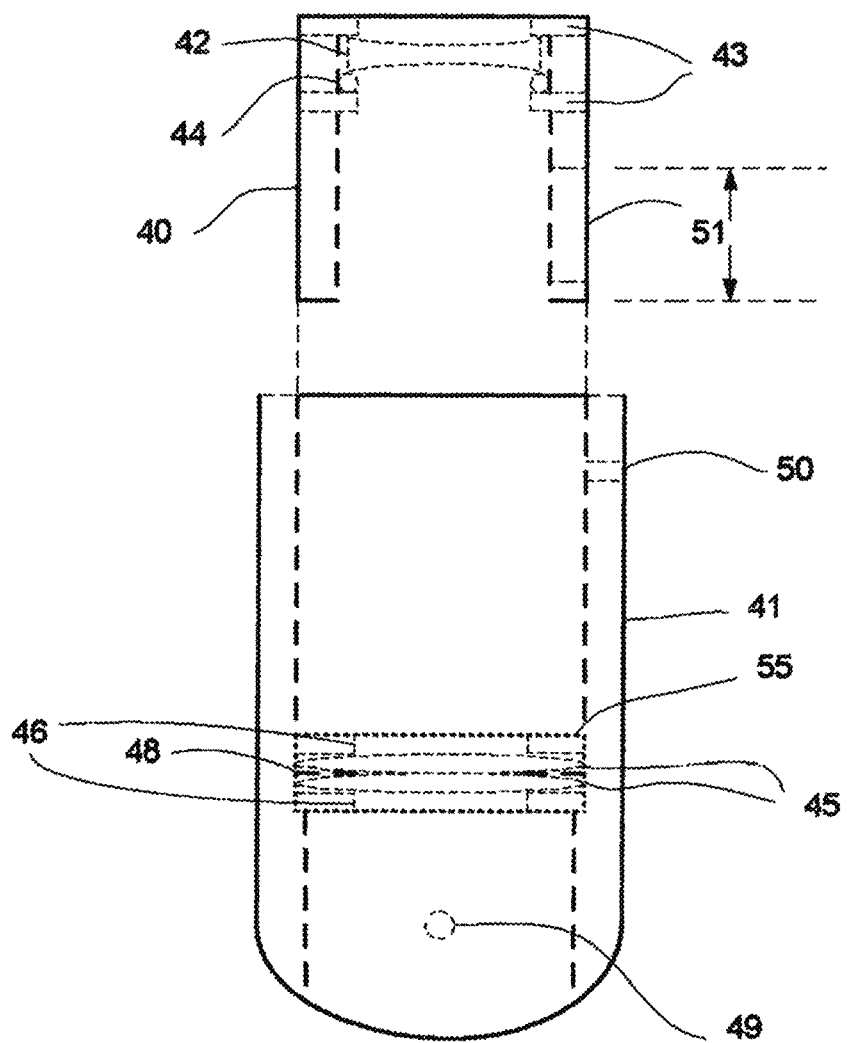
FIG. 3 shows a cross-sectional view of the companion telescopic magnifier.
Figure 4:
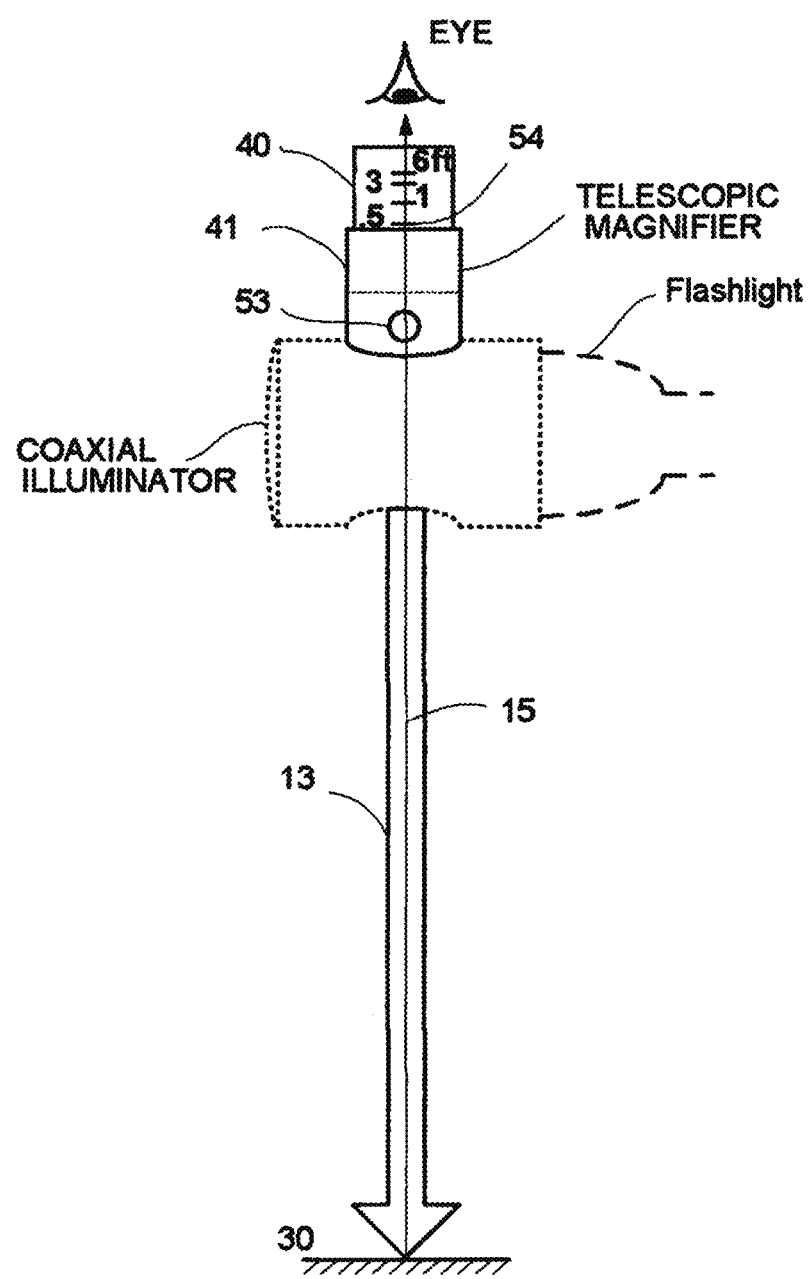
FIG. 4 shows the coaxial illuminator with the optional companion telescopic magnifier attached to a flashlight.

8 Light from flashlight
10 Opaque housing, 1¾"L, 1¼"OD, 1"ID
12 Eyepiece Body, 1⅜"L, ¾"OD, 13 mmID
14 Clear window or lens means, ½in DIA
15 Light reflected from subject surface
16 Plastic retainer rings, 13 mmOD, ⅜"ID
18 Mirror with oval hole (32) at center
20 O-ring, 1 in ID, 1/16in thick
21 Flashlight stop
22 1¼" ID plastic end cap
23 Viewing distance
28 ¾in hole in housing
30 Subject surface
31 5/16in ID hollow viewing tube
32 Viewing Hole Reference Numbers in FIGS. 3 and 4 and dimensions are for preferred embodiment 40 Eyepiece housing
41 Objective housing
42 Eyepiece lens (10 mm DIA, −11 mm FL)
43 Eyepiece lens retainers
44 Lens cushion
45 Objective lenses (0.5 in DIA, 2.69 in FL)
46 Objective lens retainers
47 Objective lens mount
48 Lens glare stop
49 Thumbscrew hole
50 Dowel pin
51 Dowel pin slot
52 Objective housing top edge
53 Thumbscrew
54 Distance scale
55 Lens mount

DETAILED DESCRIPTION OF THE INVENTION

The preferred embodiment of my detachable, deep-viewing coaxial illuminator viewing accessory is for use with a 2 AA-cell focusable-beam, high-intensity flashlight, such as a Mini-Maglite as the illumination source, and is shown in FIGS. 1 and 2. However, it may also be used with other suitable types of bright collimated light sources to view into deep recesses. It consists of an opaque plastic housing 10 into which an opaque plastic eyepiece body 12 is built. Other suitable opaque materials may be used for the housing and eyepiece body.

The eyepiece body 12 may contain a clear window 14 at the top, or a lens or lens system to provide magnification instead of a window. Alternately, an external lens or lens system (such as the companion telescopic magnifier) may be placed over the window. The window 14 is held in place between two plastic retaining rings 16, but O-rings, or a set screw, a groove in the eyepiece wall, or cement may be used to hold it in place. An eye cup may attach to the eyepiece to shield high ambient light.

The eyepiece body 12 is cut at a 45 degree angle on the bottom end inside of the housing 10 as shown in the figures, and an oval-shaped mirror 18 is bonded to it with cement. The mirror has a center oval viewing hole 32, whose edge supports the viewing tube 31 that shields light directly from the flashlight from entering the viewing field. The top end of the viewing tube attaches to the lower window retaining ring. The bottom edge of the viewing tube 31 is cut off at a 45-degree angle and is oriented to shield light from the flashlight from producing glare in the viewing field that would spoil visual contrast of distant objects.

A flashlight fits into the left side of opaque housing 10 in FIGS. 1 and 2, and is held in place by lubricated O-ring 20 seated in a groove, but other suitable attachment methods for the flashlight may be used including a thumbscrew, flexible, or snug fitting housing. Plastic end cap 22 covers the end of the housing opposite the flashlight to exclude stray light and dust. Hole 28 in the housing 10 directly below the mirror passes the flashlight illumination to the subject surface 30 below, and the reflected light from the subject surface 15 up to the eye of the observer.

Operation—FIGS. 1 and 2

The flashlight is inserted into the left side of the opaque housing 10 shown in the figures, and is snugly held in place by the O-ring 20, which accommodates small variations in the size of both the flashlight body and opaque housing due to manufacturing tolerances. A small amount of grease on the O-ring aids insertion and removal of the flashlight which is simply pushed into and pulled out of the housing An optional small step 21 in the inner wall of the housing acts as a stop for the flashlight, which will be unnecessary if the flashlight has a lip on its outer surface that prevents it from being inserted too far. Light beam 8 is focused (by adjusting the flashlight focus) for the smallest spot size on the subject matter 30. Light from the flashlight 8 enters the housing 10, and is reflected off of the diagonal mirror 18 downward through the exit hole 28 in the housing to illuminate the subject matter 30. The viewer's eye looks down through the clear window (or magnifying lens) 14 through the hollow viewing tube 31 inside the eyepiece body 12 and the holes 32 and 28 in the diagonal mirror 18 and the housing 10 respectively, to view the illuminated subject matter. The diameter of viewing tube 31 may be chosen to optimize illuminating and viewing into cavities of various widths.

The preferred embodiment of the present deep-viewing coaxial illuminator uses a 2-AA cell incandescent focusable-beam flashlight that provides clear unmagnified viewing of high-contrast (eg., black and white) objects at a distance up to 6 feet.

The illumination is exactly coaxial with the viewing axis, which permits shadow-free viewing into cavities, holes, and pipes.

A small external minor mounted below the bottom opening (exit hole) 28 of the magnifier at 45 degrees with respect to the viewing axis may be used to provide convenient right-angle viewing of objects.

Description of the Companion telescopic magnifier.

The preferred embodiment of the present companion telescopic magnifier for the coaxial illuminator sharply focuses on objects from 6 ft to ½ ft distant, and provides 3×-5× magnification respectively, over this distance range. Magnification is not specifically adjustable, but is somewhat higher at small object distances due to the optical configuration of this telescopic magnifier and the small viewing distances.

Objects and Advantages (a) It features economic, light weight, compact construction and it easily attaches securely to the coaxial illuminator eyepiece. It is easily removable.

(b) It provides non-inverted viewing of objects, and the focus may be easily adjusted over the distance range of the illuminator. Distance scale 54 on the telescope eyepiece housing 40 allows presetting the focus to the estimated distance before viewing.

(c) It is constructed of mostly plastic and paper parts, which may be injection molded or stamped inexpensively in large quantities.

Description of FIG. 3

The telescopic magnifier body consists of two opaque telescoping plastic housings. The objective housing 41 holds the objective lens means 45, and attaches to the illuminator eyepiece with a thumbscrew 53. The objective lens means is a positive lens which may be a single element lens or a multiple element lens. The lens retaining rings 46 and lens means 45 fit snugly into the lens mount 55 that in turn fits snugly inside the objective housing. An opaque black paper aperture 48 placed between the lenses functions as a glare stop. The end of the housing below the thumbscrew is rounded and contoured to fit snugly over the illuminator body.

The eyepiece housing 40 holds the eyepiece, or ocular, lens means 42 and slides snugly in and out of the objective housing 41. The eyepiece lens means is a negative lens, but may have more than one element. A optional lens cushion 44 holds the lens means snugly in place between the two plastic retaining rings 43.

A slot 51 in the side of the eyepiece housing fits dowel pin 50 in the objective housing so the eyepiece may be focused with a purely up-down motion and limit its adjustment range. Distance scale 54 printed on the eyepiece housing allows presetting the magnifier focus to a known distance.

The lenses and housings form a "Galilean" telescope configuration that provides erect-image (non-Inverted) viewing. Although it has a narrow field of view, it is intended for viewing into holes so is not a limitation for this application. The magnification varies somewhat with focus distance due to the short distances involved. The lens focal lengths and diameters are chosen so the telescope body (eyepiece housing plus objective housing) is suitably very short and small for use as a flashlight accessory.

Operation of the coaxial illuminator with companion telescopic magnifier in FIGS. 1-4:

Prior to attaching the telescopic magnifier to the illuminator, the object is first viewed through the eyepiece window of the illuminator mounted on a lighted flashlight shown in FIGS. 1 and 2. The distance to the object is estimated (even if inside a hole or recess), so the magnifier focus may be preset to the correct distance using the distance scale on the movable eyepiece housing 40 in FIG. 4. The eyepiece is pulled out or pushed into the objective housing 41 until the distance scale 54 mark (on the eyepiece) for the desired distance is even with the top edge of the objective housing 41.

The telescopic magnifier is then placed over the illuminator eyepiece 12 and is held snugly in place by tightening the thumbscrew 53 on the magnifier objective housing. The object to view will then be prefocused for viewing through the magnifier eyepiece.

I claim:

1. A viewing accessory for use with a nonphotographic flashlight, to provide coaxial illumination, consisting of:
   a) a tubular housing with an open end and a closed end, said open end having a gripper means therein for removable attachment of the accessory to said flashlight;
   b) a mirror with a central hole mounted at a fixed angle within said housing, and positioned to reflect a focused beam of light from said flashlight onto an object being viewed;
   c) a viewing lens means or window within said housing, and positioned to receive light transmitted through said central hole from the object being viewed; and
   d) an opening in said housing, opposite said lens means or window, through which light is directed for illumination of the viewed object, and coaxially reflected back through said central hole to said lens means or window.

2. A removable companion telescopic magnifier to be used the viewing accessory for flashlight of claim 1, in lieu of a lens means that is part of its eyepiece body, to focus the viewed object at various distances from the said viewing accessory, and consists of:
   a) a body consisting of two opaque movable telescoping housings; and
   b) with a lens means in each movable housing that forms a focusable magnifying telescope to view objects at various distances from the viewing accessory.

* * * * *